(12) United States Patent
Freyman et al.

(10) Patent No.: US 7,190,198 B2
(45) Date of Patent: Mar. 13, 2007

(54) VOLTAGE CONTROLLED DELAY LOOP WITH CENTRAL INTERPOLATOR

(75) Inventors: Ronald L. Freyman, Bethlehem, PA (US); Vladimir Sindalovsky, Perkasie, PA (US); Lane A. Smith, Easton, PA (US); Craig B. Ziemer, Fleetwood, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/999,889

(22) Filed: Nov. 30, 2004

(65) Prior Publication Data

US 2006/0114045 A1    Jun. 1, 2006

(51) Int. Cl.
*H03L 7/06* (2006.01)
(52) U.S. Cl. ........................ 327/149; 327/153
(58) Field of Classification Search ............... 327/149, 327/153, 158, 161–163, 291, 294, 299; 331/1 A, 331/25, 17; 375/373–376
See application file for complete search history.

(56) References Cited

U.S. PATENT DOCUMENTS

| | | | | |
|---|---|---|---|---|
| 6,281,726 B1 * | 8/2001 | Miller, Jr. | ................... | 327/156 |
| 6,650,157 B2 * | 11/2003 | Amick et al. | ............... | 327/158 |
| 2004/0076192 A1 * | 4/2004 | Zerbe et al. | ................. | 370/516 |
| 2005/0278131 A1 * | 12/2005 | Rifani et al. | .................. | 702/79 |

FOREIGN PATENT DOCUMENTS

WO    WO 97/14214    4/1997

\* cited by examiner

*Primary Examiner*—Linh My Nguyen

(57) ABSTRACT

A voltage controlled delay loop and method are disclosed for clock and data recovery applications. The voltage controlled delay loop generates clock signals having similar frequency and different phases. The voltage controlled delay loop comprises at least one delay element to generate at least two phases of a reference clock; a central interpolator for interpolating the at least two phases of the reference clock to generate an interpolated signal; and an input that injects the interpolated signal into a delay stage. The central interpolator provides a fine phase control. In addition, a coarse phase control can optionally be achieved by selectively injecting the interpolated signal into a given delay stage. A further voltage controlled delay loop is disclosed with coarse and fine phase control using a number of interpolators.

20 Claims, 4 Drawing Sheets

ABSTRACT# VOLTAGE CONTROLLED DELAY LOOP WITH CENTRAL INTERPOLATOR

CROSS-REFERENCE TO RELATED APPLICATIONS

The present invention is related to U.S. patent application Ser. No. 10/999,900, entitled "Voltage Controlled Delay Loop and Method With Injection Point Control," filed contemporaneously herewith and incorporated by reference herein.

FIELD OF THE INVENTION

The present invention is related to techniques for clock and data recovery (CDR) and, more particularly, to methods and apparatus for digital control of the generation and selection of different phases of a clock signal.

BACKGROUND OF THE INVENTION

In many applications, including digital communications, clock and data recovery (CDR) must be performed before data can be decoded. Generally, in a digital clock recovery system, a reference clock signal of a given frequency is generated together with a number of different clock signals having the same frequency but with different phases. In one typical implementation, the different clock signals are generated by applying the reference clock signal to a delay network. Thereafter, one or more of the clock signals are compared to the phase and frequency of an incoming data stream and one or more of the clock signals are selected for data recovery.

A number of existing digital CDR circuits use voltage controlled delay loops (VCDL) to generate a number of clocks having the same frequency and different phase for data sampling (i.e., oversampling). For example, published International Patent Application No. WO 97/14214, discloses a compensated delay locked loop timing vernier. The disclosed timing vernier produces a set of timing signals of similar frequency and evenly distributed phase. An input reference clock signal is passed through a succession of delay stages. A separate timing signal is produced at the output of each delay stage. The reference clock signal and the timing signal output of the last delay stage are compared by an analog phase lock controller. The analog phase lock controller controls the delay of all stages so that the timing signal output of the last stage is phase locked to the reference clock. Based on the results of the oversampled data, the internal clock is delayed so that it provides data sampling adjusted to the center of the "eye." The phase of the VCDL is adjusted to keep up with phase deviations of the incoming data.

While such voltage controlled delay loops effectively generate the sampling clocks and control the delay stages to maintain alignment of the reference clock signal and the last timing signal, they suffer from a number of limitations, which if overcome, could further improve the utility of such voltage controlled delay loops. For example, the analog implementation of the phase lock controller is complex and generally cannot be easily ported from one technology to another. In addition, digital-to-analog conversion is required to convert lo the digital phase adjustment control into analog signal control. A need therefore exists for voltage controlled delay loops with digital phase control.

SUMMARY OF THE INVENTION

A voltage controlled delay loop and method are disclosed for clock and data recovery applications. The voltage controlled delay loop generates clock signals having the same frequency and different phases. The voltage controlled delay loop comprises at least one delay element to generate at least two phases of a reference clock; a central interpolator for interpolating at least two phases of the reference clock to generate an interpolated signal; and an input that injects the interpolated signal into a delay stage. The central interpolator provides a fine phase control. In addition, a coarse phase control can optionally be achieved by selectively injecting the interpolated signal into a given delay stage.

According to another aspect of the invention, coarse and fine phase control is provided in a voltage controlled delay loop using a number of interpolators. The voltage controlled delay loop comprises a plurality of delay elements; an input that selectively injects a reference clock into any one of the plurality of delay elements to provide a coarse phase control; and a plurality of interpolators associated with the delay elements that interpolate at least two adjacent phases to generate the desired clock signal.

A more complete understanding of the present invention, as well as further features and advantages of the present invention, will be obtained by reference to the following detailed description and drawings.

DETAILED DESCRIPTION

The present invention provides voltage controlled delay loops with digital phase control. The present invention controls the phase offset from the reference clock to the data sampling clock by shifting the injection point of the reference clock into the voltage controlled delay loop.

Figure 1:
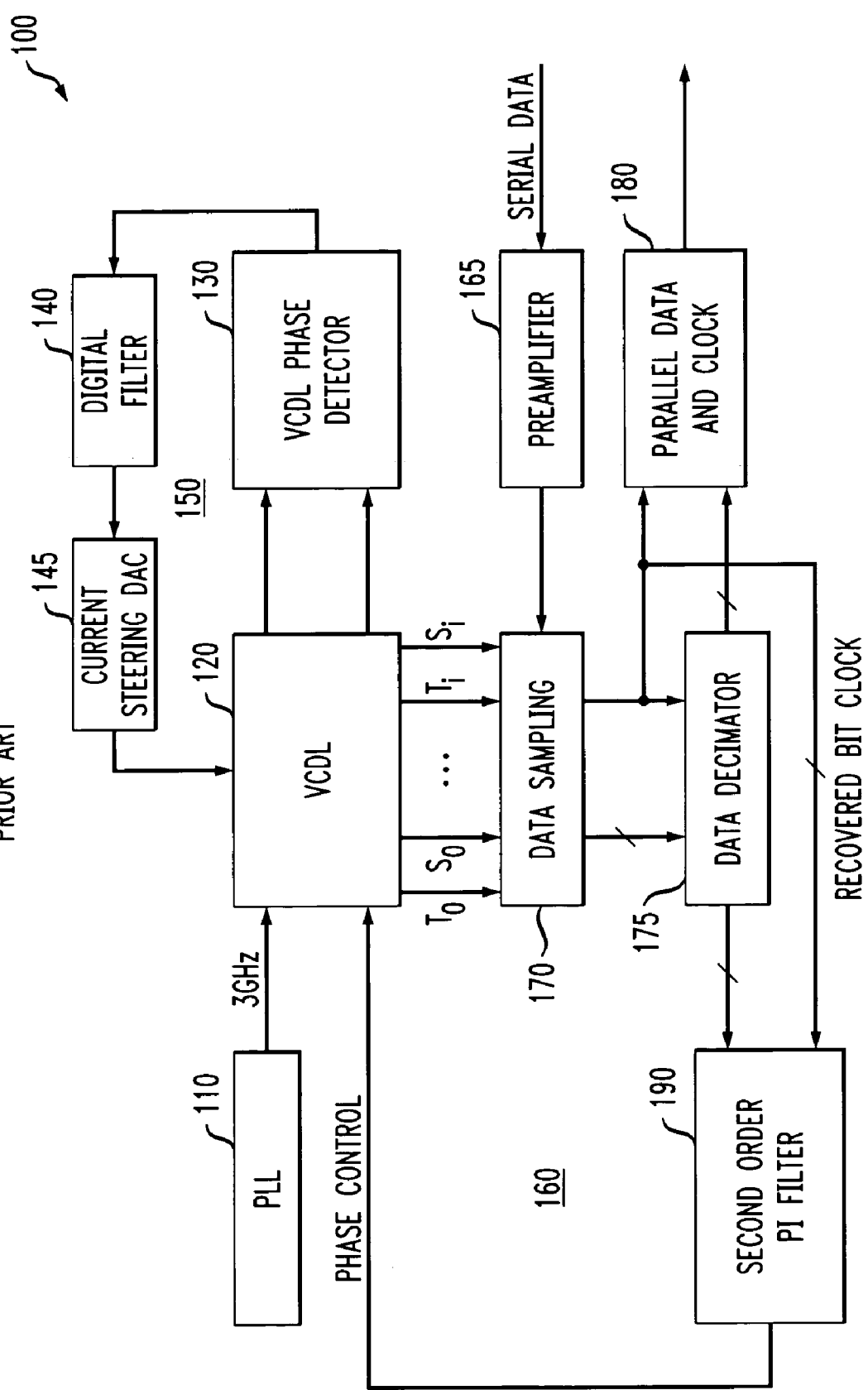
FIG. 1 illustrates an exemplary conventional clock recovery circuit.

FIG. 1 illustrates an exemplary conventional clock recovery circuit 100. As shown in FIG. 1, the clock recovery circuit 100 produces a clock signal with a predetermined number of phases, $T_0$, $S_0$, ... $T_i$, $S_i$, discussed below in conjunction with FIG. 2. The exemplary clock recovery circuit 100 includes a reference clock signal (3 GHz, for example) generated by a phase locked loop (PLL) 110 and applied to the input of a voltage controlled delay line 120. As shown in FIG. 1, the voltage controlled delay loop 120 interacts with two control loops 150, 160. The first phase control loop 150 is comprised of a VCDL phase detector 130, a digital filter 140 and a current steering DAC 145. Generally, the first control loop 150 adjusts the delays of the voltage controlled delay loop 120. The reference signal and the output of the VCDL 120 are applied to the VCDL phase detector 130 which provides phase detection by producing an output representative of the phase difference that is applied to a filter 140 whose digital output is converted to an analog current by the DAC 145 to control the delay in the stages of the voltage controlled delay loop 120.

The second data control loop 160 is comprised of a preamplifier 165, a data sampling block 170, a data decimator 175, a parallel data and clock output block 180 and a second order proportional and integral (PI) filter 190. The serial data is received and amplified by the preamplifier 165 and applied to the data sampling block 170. The data sampling block 170 samples the data using the plurality of phases, $T_0, S_0, \ldots T_i, S_i$. The data samples are then applied to the optional data decimator 175 that drops the data rate, for example, by a factor of two. In addition, the data sampling block 170 provides a recovered bit clock output that is applied to the data decimator 175, parallel data and clock output block 180 and second order PI filter 190. The parallel data and clock output block 180 outputs the sampled serial data and recovered lower frequency clock as parallel data (usually 16 or 20 bit wide) and clock. The second order PI filter 190 interprets the transition and sample information associated with the, $T_0, S_0, \ldots T_i, S_i$ samples to generate phase control information for the VCDL 120. Generally, the phase control information ensures that the transitions clocks are maintained close to the transition points in the serial data (see FIG. 2).

Figure 2:
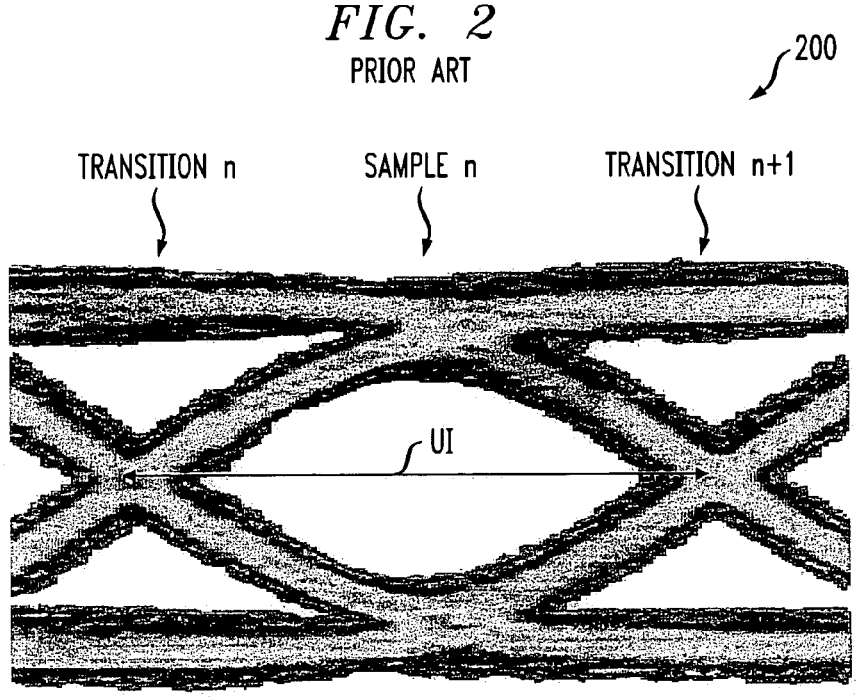
FIG. 2 illustrates the transitions in a data stream.

FIG. 2 illustrates the transitions in a data stream 200. As shown in FIG. 2, the data is ideally sampled in the middle between two transition points. The phases $T_i, S_i$ generated by the VCDL 120 are adjusted to align with the transitions and sample points, respectively. Thus, the internal clock is delayed so that the data sampling is adjusted to the center of the "eye," in a known manner.

Figure 3:
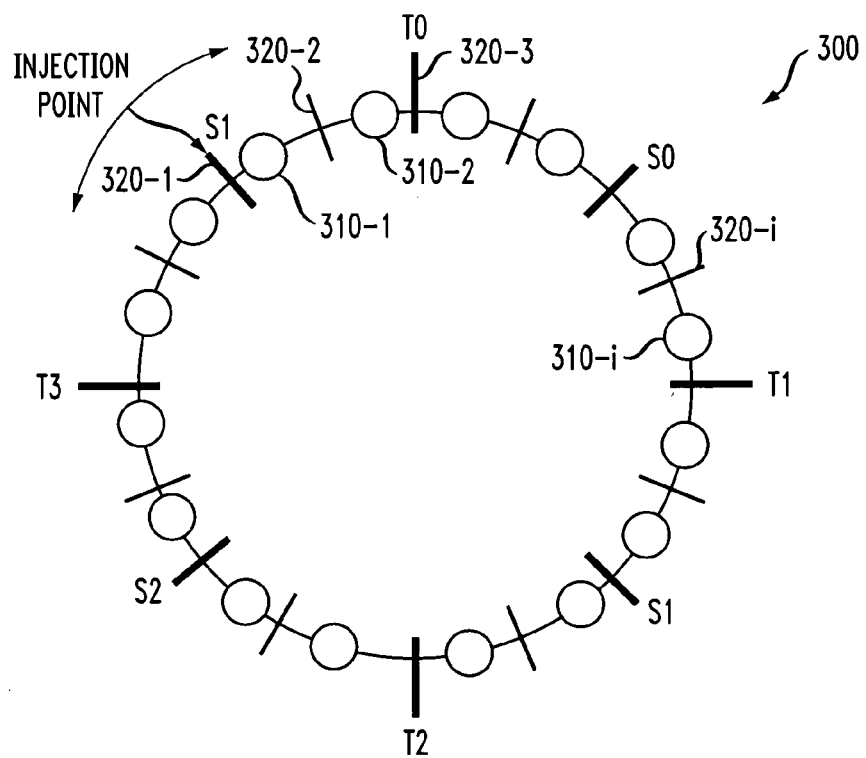
FIG. 3 illustrates a VCDL having coarse phase control.

FIG. 3 illustrates a VCDL 300 having coarse phase control. In order to control the phase offset between the PLL frequency and data sampling ($S_i$) and transition sampling ($T_i$), the injection point of the PLL frequency into the VCDL 120 is shifted. As shown in FIG. 3, the exemplary VCDL 300 is generally comprised of a succession of 16 delay elements, for example, 310-1 through 310-16 interconnected in a loop. The exemplary VCDL 300 also includes 16 inputs 320-1 through 320-16 that are each connected to an associated delay line 310-$i$. The correlation between the various phases $T_i, S_i$ generated by the VCDL 300 to the delay elements 310 is also shown in FIG. 3. As shown in FIG. 3, the injection point where the PLL signal is applied to the VCDL can be shifted in accordance with the present invention to any input 320-$i$.

The embodiment of FIG. 3 moves the injection point by one full delay element, thereby producing significant quantization noise in the VCDL 300. In the exemplary embodiment of FIG. 3, with four delay elements per unit interval (UI), the quantization noise would be +/−¼ UI, which limits the jitter tolerance of the CDR to ½ UI. Thus, the movement of the injection point may not be fine enough to provide the necessary precision in the phase adjustment. In order to resolve this problem, a phase interpolator can be used, as discussed further below in conjunction with FIGS. 4 and 5. The interpolator provides a fractional delay between the output phases from the delay elements.

Figure 4:
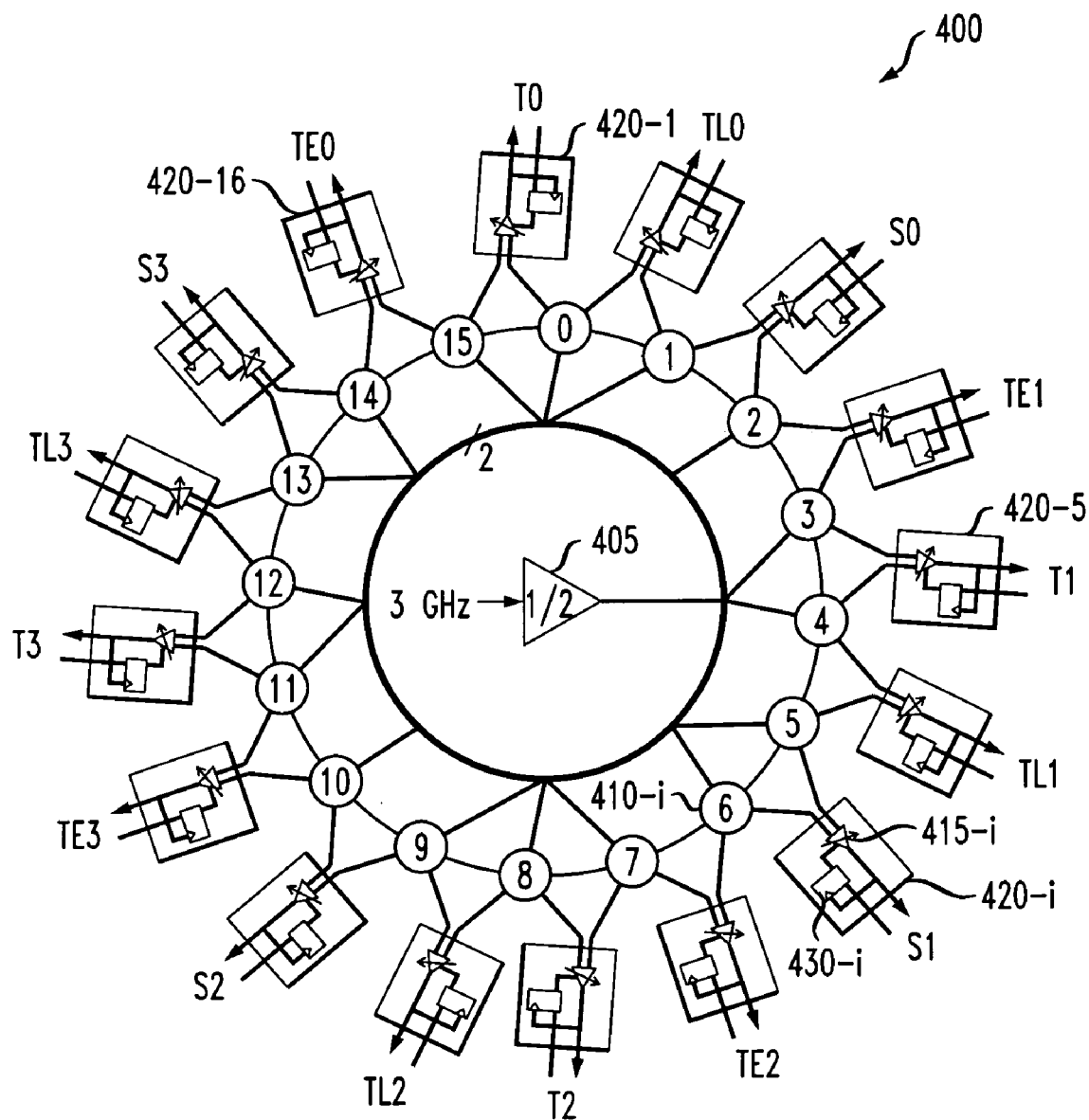
FIG. 4 illustrates a VCDL having the coarse phase control provided by the injection point control of FIG. 3 and fine phase control provided by an interpolator associated with each delay stage.

FIG. 4 illustrates a VCDL 400 having the coarse phase control provided by the injection point control of FIG. 3, as well as a fine phase control provided by an interpolator 420-$i$ associated with each delay stage 410-$i$. The input PLL signal, for example, having a frequency of 3 GHz, is applied to an optional frequency divider 405 that reduces the frequency, for example, in half. As discussed above in conjunction with FIG. 3, the PLL frequency can optionally be injected in any delay stage.

In the exemplary embodiment of FIG. 4, there are 16 delay stages 410. The entire delay through the bank of delay stages is equal to four unit intervals (UIs). Thus, each set of four consecutive delay stages 410 corresponds to one unit interval. For example, the clock phases $TE_1, T_1, TL_1$ and $S_1$, correspond to one unit interval, as shown by the table 440 in FIG. 4. As shown in the table 440, the interpolator 420 associated with phase $TE_1$ can produce phases in the range of 0 through ¼ UI.

As shown in FIG. 4, each interpolator, such as the interpolator 420-$i$, is comprised of an interpolator 415-$i$ and a flip flop 430-$i$. The flip flop 430-$i$ has an external control (not shown) and serves as a synchronizer for the associated interpolator 420-$i$ to ensure that the clock edge has passed through before the interpolation setting is changed. The interpolator 415-$i$ takes the output of two adjacent delay elements 410 and produces a phase in between the phases associated with each adjacent delay element 410, in a known manner (for example, using summing of the contributions of the two input signals in various ratios).

Providing a separate interpolator 410-$i$ for each delay stage is costly in terms of power and area. In addition, the interpolators must be well matched to each other to prevent clock phases from wandering in respect to each other. If the multiple interpolators are not well-matched, the interpolated phase of one interpolator may change it's phase offset in respect to the adjacent interpolator phase, which is not desirable. Finally, the timing requirements associated with switching all of the interpolators to a new phase setting while clock signals are propagating down the delay line are difficult.

Figure 5:
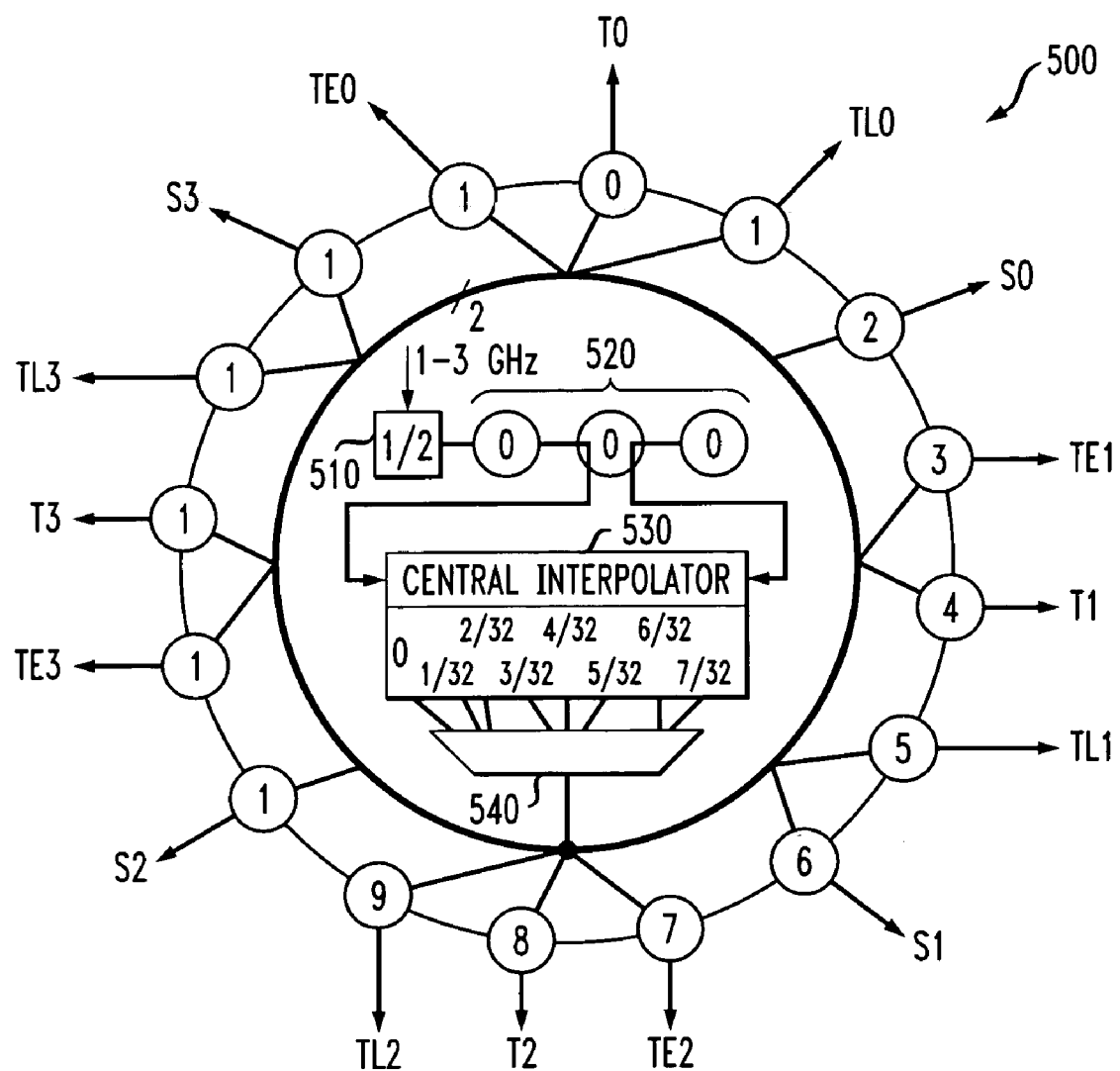
FIG. 5 illustrates a VCDL incorporating features of the present invention with coarse phase control provided by the injection point control of FIG. 3 and fine phase control provided by a central interpolator.

FIG. 5 illustrates a VCDL 500 incorporating features of the present invention and having the coarse phase control provided by the injection point control of FIG. 3, as well as a fine phase control provided by a central interpolator 530. Thus, the PLL signal that is injected into the VCDL 500 is first interpolated to provide fine phase control. Following the fine phase control, the injection point may optionally be adjusted to provide a coarse phase control, using the approach of FIG. 3.

As shown in FIG. 5, the input PLL signal, for example, having a frequency of 1–3 GHz, is applied to an optional frequency divider 510 that reduces the frequency, for example, in half. As discussed above in conjunction with FIG. 3, the output of the central interpolator can optionally be injected in any delay stage 310. The output of the frequency divider 510 is then applied to a delay stage 520 having one or more delay elements (e.g., each providing a ¼ UI delay). The delay stage 520 is connected to the central interpolator 530 such that the left and right inputs to the central interpolator 530 are separated by at least one delay element, as shown in FIG. 5.

The exemplary central interpolator 530 provides a number, for example 8, distinct phases (over ¼ UI range), between each coarse phase setting. A multiplexer 540 selects the desired phase. If the phase must be adjusted beyond the granularity provided by the central interpolator 530 (i.e., more than a ¼ UI), then a coarse phase adjustment is made by adjusting the injection point (providing a granularity of ¼ UI).

The single central interpolator 530 thus effectively provides the same number of precise clock phases as the method of FIG. 4 with significantly reduced power and area requirements. In addition, the single, central interpolator 530 eliminates the matching requirements and timing requirements between the various interpolators of FIG. 4.

If, for example, the central interpolator 530 generates seven additional phases between delay stages, quantization noise is improved by a factor of 8 to +/−1/32 UI, and thus jitter tolerance of the VCDL is significantly improved.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for generating a clock signal having a desired phase, comprising the steps of:
    generating at least two phases of a reference clock;
    interpolating said at least two phases of said reference clock to generate an interpolated signal; and
    injecting said interpolated signal into a voltage controlled delay loop having a plurality of delay elements, wherein said interpolated signal is selectively injected into any one of said plurality of delay elements.

2. The method of claim 1, wherein said generating step further comprises the step of delaying said reference clock.

3. The method of claim 1, wherein said voltage controlled delay loop comprises a plurality of delay elements that are connected in series.

4. The method of claim 1, wherein said interpolating step maintains a desired phase relationship between said reference clock and an injection clock.

5. The method of claim 1, wherein said interpolating step further comprises the step of selecting an interpolated signal having a desired phase.

6. The method of claim 1, wherein said clock signal is used for clock and data recovery.

7. A voltage controlled delay loop, comprising:
    at least one delay element to generate at least two phases of a reference clock;
    a central interpolator for interpolating said at least two phases of said reference clock to generate an interpolated signal; and
    an input that selectively injects said interpolated signal into any one of a plurality of delay stages.

8. The voltage controlled delay loop of claim 7, further comprising a plurality of delay stages connected in series.

9. The voltage controlled delay loop of claim 7, wherein said central interpolator maintains a desired phase relationship between said reference clock and an injection clock.

10. The voltage controlled delay loop of claim 7, wherein said central interpolator further comprises a multiplexer for selecting an interpolated signal having a desired phase.

11. An integrated circuit, comprising:
    a voltage controlled delay loop, comprising:
    at least one delay element to generate at least two phases of a reference clock;
    a central interpolator for interpolating said at least two phases of said reference clock to generate an interpolated signal; and
    an input that selectively injects said interpolated signal into any one of a plurality of delay stages.

12. The integrated circuit of claim 11, further comprising a plurality of delay stages connected in series.

13. The integrated circuit of claim 11, wherein said central interpolator maintains a desired phase relationship between said reference clock and an injection clock.

14. The integrated circuit of claim 11, wherein said central interpolator further comprises a multiplexer for selecting an interpolated signal having a desired phase.

15. A method for generating a clock signal having a desired phase, comprising the steps of:
    selectively injecting a reference clock into any one of a plurality of delay elements, said plurality of delay elements generating a plurality of phases; and
    interpolating at least two phases of said plurality of phases to generate said clock signal, wherein each of said delay elements has an associated interpolator that interpolates at least two adjacent phases of said plurality of phases to generate said clock signal.

16. The method of claim 15, wherein said plurality of delay elements are connected in series.

17. The method of claim 15, wherein said injection point is shifted to maintain a desired phase relationship between said reference clock and a sample clock.

18. A method for generating a clock signal having a desired phase, comprising the steps of:
    selectively injecting a reference clock into any one of a plurality of delay elements, said plurality of delay elements generating a plurality of phases; and
    interpolating at least two phases of said plurality of phases to generate said clock signal, wherein each of said delay elements has an associated interpolator that interpolates at least two phases of said plurality of phases to generate said clock signal, wherein each of said delay elements has an associated multiplexer and wherein said injecting step further comprises the step of selecting one of said reference clock and a signal from a previous delay element at each of said multiplexers.

19. A clock recovery system including a voltage controlled delay loop, comprising:
    at least one delay element to generate at least two phases of a reference clock;
    a central interpolator for interpolating said at least two phases of said reference clock to generate an interpolated signal; and
    an input that selectively injects said interpolated signal into any one of a plurality of delay stages.

20. A data recovery system including a voltage controlled delay loop, comprising:
    at least one delay element to generate at least two phases of a reference clock;
    a central interpolator for interpolating said at least two phases of said reference clock to generate an interpolated signal; and
    an input that selectively injects said interpolated signal into any one of a plurality of delay stages.

* * * * *